United States Patent [19]

Mayer

[11] 4,124,248
[45] Nov. 7, 1978

[54] MOTORCYCLE SEAT

[76] Inventor: William J. Mayer, 3647 Foothill Rd., Santa Barbara, Calif. 93105

[21] Appl. No.: 842,517

[22] Filed: Oct. 17, 1977

[51] Int. Cl.² ............................................. B62J 1/00
[52] U.S. Cl. .................................... 297/204; 297/284
[58] Field of Search ............... 297/195, 201, 204, 197, 297/215, 250, 452, 459, 243, 284; 267/89, 102

[56] References Cited

U.S. PATENT DOCUMENTS

| 574,673 | 1/1897 | Draper | 297/204 |
|---|---|---|---|
| 584,905 | 6/1897 | Tompkins | 297/204 X |
| 674,199 | 5/1901 | Cuthbert | 297/284 |
| 3,086,817 | 4/1963 | Wilfert | 297/284 |
| 3,095,188 | 6/1963 | Giese | 297/284 |
| 3,378,299 | 4/1968 | Sandor | 297/284 |

FOREIGN PATENT DOCUMENTS 285,652  2/1928  United Kingdom ................ 297/204
1,365,348  9/1974  United Kingdom ................ 297/284

Primary Examiner—Roy D. Frazier
Assistant Examiner—Peter A. Aschenbrenner
Attorney, Agent, or Firm—Christie, Parker & Hale

[57] ABSTRACT

Springs and straps laterally and vertically buttress lateral buttock support wings of a motorcycle seat. The springs are flat and sinuous and extend slightly upward and outward from the seat pan to support the seat wings. Straps secure to the springs and pass inwardly from them through a hole in the pan to an anchor point for the straps underneath the pan. The length of the straps is adjustable to adjust the lateral distance between the springs in the wings and the response to force applied to the springs. The straps restrain the springs in their spreading under rider load. The looser the straps the more the springs deflect vertically and laterally under rider load.

21 Claims, 6 Drawing Figures

MOTORCYCLE SEAT

BACKGROUND OF THE INVENTION

The present invention relates to seats in general and, more in particular, to a seat especially adapted for motorcycle use.

Motorcycle seats at one time provided lateral support by wings of the seat extending upwardly and outwardly from the bottom of the seat. This lateral support held a rider and reduced riding fatigue. However, no attempt was made to tailor the seat to the requirements of different riders.

Modern motorcycles come equipped with long wedge seats that resemble a beam and provide no lateral buttocks support. The reason for this is that the seat must be used by both short and tall riders, as well as all sizes in-between.

A rider moves along the long wedge seat to find a spot suitable for the rider's size. This solution to the variable height rider comes at the expense of uniform load distribution on the rider by the seat and low unit loads on the rider by the seat. For example, a rider's leg must drop to reach the ground, brake, or change gears and this increases loading on the rider where the anatomy is not designed to carry weight. The lack of lateral buttocks support means the entire load of a rider must be carried in a small area. This lack of lateral support also is felt on centrifugal loads.

Springs have been used in seating for a long time to provide stiffness, resistance, and load shock attenuation. In use, with the passage of time, springs can take a set. This results in the seat having different support qualities than it originally had. One possibility of excessive set is that the seat bottoms prematurely, resulting in the loss of the support that the springs originally gave the seat.

Modern seating uses foam as a cushion material. In time the foam degrades and compresses, losing thickness. This changes seat shape and results in a different seat contour than desired.

Furthermore, different motorcycle riders and different motorcycling conditions require different seats. Regrettably, there has been no way in the past to accommodate different rider anatomies, riding conditions, and rider preference.

SUMMARY OF THE INVENTION

The present invention provides a motorcycle seat with lateral wings for buttocks support which include spring elements that resist vertical and lateral displacement and straps tied down to a support base, such as a seat pan, to restrain the springs and beneficially alter their deflection. The straps pass inwardly and above the springs for direct loading by a rider and support of the seat bottom and wings. In a preferred embodiment, the length of the straps is adjustable. Accordingly, the amount of deflection of the springs is adjustable. This adjustment permits changes in the character of the seat to suit the requirements of a rider.

In a specific form, the present invention provides a motorcycle seat that has at least one rider seat with a pair of laterally and upwardly extending buttocks side support wings. The wings include spring elements that are flat when unstressed and which extend generally parallel to the plane of the wings and beneath cushions of the wings. These lateral spring support elements resist deflection of the wings downwardly and outwardly. The springs attach to a seat support base such as a pan. The springs may be contoured by giving them an initial set to develop the desired spacing between the wings and the desired included angle of the wings, both with reference to an unloaded seat. Restraint straps tie onto free ends of the springs in the wings and pass inwardly of them through a passage in the seat support base to attach below the base to the base. The length of the straps is adjustable and the straps can be fixed by a buckle. The springs preferably constitute a pair of side-by-side, opposed, sinuous spring elements tied together in a convenient fashion at their closest approach, which is at alternate bends in the springs. Each spring extends continuously from one wing to the other.

These and other features, aspects and advantages of the present invention will become more apparent from the following description, appended claims and drawings.

DESCRIPTION OF THE PREFERRED EMBODIMENT

Figure 1:
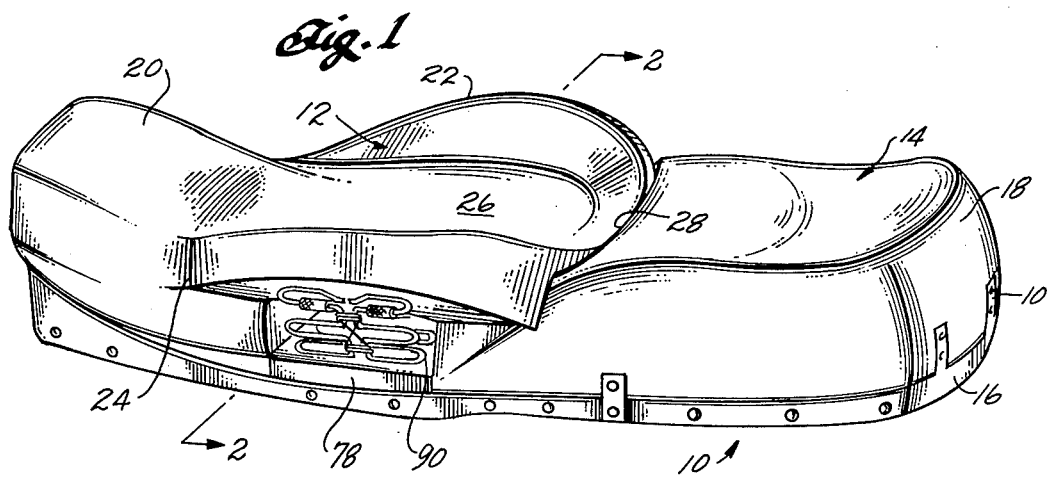
FIG. 1 is a perspective view of a two-rider motorcycle seat constructed in accordance with the present invention looking slightly downwardly and forwardly of the seat.

With reference to FIG. 1, a motorcycle seat 10 constructed in accordance with the principles of the present invention is illustrated. The seat is a two-rider seat and includes a front seat 12 and a rear seat 14. The front seat will receive the bulk of the focus in this discussion for it embodies the construction of the invention. The presence of the rear seat, constructed in accordance with prior practice, shows the adaptability of the present invention. It is possible to have the rear seat constructed just as the front one.

Seat 10 includes a base in the form of a pan 16 that attached to the frame of a motorcycle. Foam cushion material 18 defines the back seat. Foam material of the front seat defines a horn 20, lateral wings 22 and 24, seat base or bottom 26, and seat back 28. Seat wings 22 and 24 provide lateral support to the buttocks of a rider.

Figure 2:
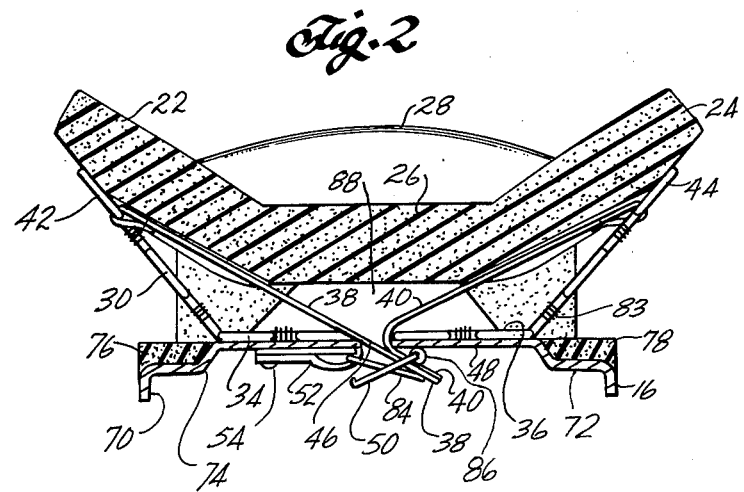
FIG. 2 is a view taken in vertical section looking along lines 2—2 of FIG. 1.
Figure 3:
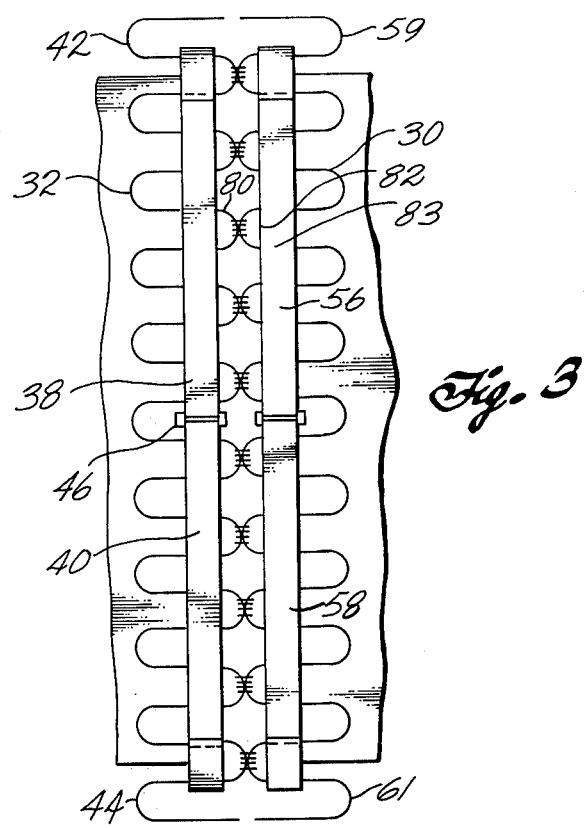
FIG. 3 is a top plan view of the spring and strap construction of the motorcycle seat of the present invention.

With reference to FIGS. 2 and 3, flat, sinuous form springs 30 and 32 pass beneath the seat base, and bend up and laterally out to form the base of wings 22 and 24. Each spring extends continuously from within one spring to within the other. As shown, the springs resist deflection of the wings laterally and downwardly. The springs are bent to suit the particular requirements of a rider, as at 34 and 36, in FIG. 2. The gauge of the springs can be varied to the same end. The stiffness of the seat, or conversely the amount of give of the seat, can be changed by changing the position of the bends of the springs, thus determining the length of the springs abutting against pan 16. By having the bends closer to the center of the pan, more free spring above the pan is presented and the stiffness of the system is reduced while its give is increased. In other words, the amount of free spring and the load supported by the spring can be varied by varying the length of spring lying against the pan.

Straps 38 and 40 secure respectively around end convolutions 42 and 44 of spring 30. The straps extend laterally inward of end convolutions into the valley defined between the wings and downward through a hole 46 in a floor 48 of pan 16. The straps are secured by a friction buckle 50 (shown somewhat open for drawing clarity). A loop 52 anchored by a fastener 54 to floor 48 of pan 16 receives and holds the buckle.

A complementary set of straps 56 and 58 loop around the end convolutions of spring 30, as shown at 59 and 61, and pass through the floor of the pan for attachment by a buckle in the manner of straps 38 and 40. Straps 38, 40, 56 and 58 may be inelastic or elastic.

As can be seen in FIG. 3, springs 30 and 32 loosely couple to pan 16 by the straps. The straps pass between convolutions of the springs as the straps pass into the holes in the pan. Forces along the length of the springs cause the springs to shift slightly and engage the straps in the path of the springs. The straps, in turn, transfer the load to the pan. Forces on the springs along the fore and aft axes of the seat are small and would be taken out by the straps, if necessary. Spring attachment to the pan is easy because of this attachment through the straps.

By tightening straps 38 and 40 the included angle defined between wings 22 and 24 is reduced slightly. The resultant deflection of the spring is complex but it generally will increase the stiffness of the seat because of the increased tension in the straps. The straps actually bear and cradle a rider above floor 48 of the pan and so are an integral part of the spring support system. Conversely, loosening the straps reduces the tension in them and permits seat base 26 to deflect more readily towards the floor of the pan.

Figure 4A:
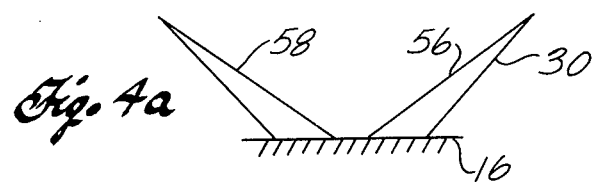
FIGS. 4a through 4c shows schematically spring and strap loading and deflection.
Figure 4B:
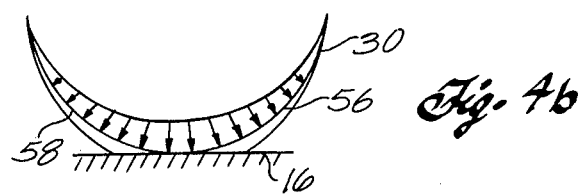
Figure 4C:
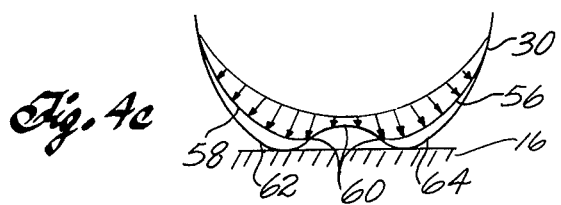

FIGS. 4a, 4b, and 4c illustrate schematically the deflections encountered by the cradle defined by the spring and strap system just described. In FIG. 4a, spring 30 bears no rider load. The only loading of the spring is from straps 56 and 58. A horizontal portion of the spring, between bends 34 and 36, bears on pan 16.

In FIG. 4b, a rider's load on the cradle defined by the spring and strap is shown by the arrows. Horizontal and vertical loads stress the cradle. The cradle responds by the straps deflecting downward and the springs deflecting inward. The inward deflection of the springs is limited by the wings contacting the sides of the rider's hips and thighs. The spring also deflects to develop opposed, concave curves. With downward deflection of the straps, the straps approach the spring and pull on the spring, more along the spring length than in the FIG. 4a array. Nonetheless, because of the increase in load, the spring experiences more bending forces and takes on the bow shown in FIG. 4b. The convolutions close to the tie-in points of the straps to the springs, the ends of the spring remote from the pan, are loaded dominantly parallel to the plane of the spring there. The loading becomes more and more in torsion as the distance from the tie-in points increases because of the curvature of the springs. Eventually the vertical load goes out through the pan. The horizontal forces, if unbalanced, go to the pan by the spring loading the strap at the pan and the strap transferring this load to the pan.

In FIG. 4c, the horizontal and vertical loading of the spring has caused the spring to bow up off the pan at 60 and to bear on the pan at spaced-apart points 62 and 64. This gives a span of the spring between these points which can yield to vertical loads over them.

In somewhat greater detail, pan 16 has perimetric vertical flange 70 extending downwardly from a horizontal band 72 which in turn steps down from floor 48 through a rise 74. Foam cushions 76 and 78 beneath springs 30 and 32 cushion the portion of the springs over the cushions from hard contact with the pan.

Flat springs 30 and 32 are oriented in opposed fashion with touching bights or bends secured together as by heavy duty string. One such union is shown in FIG. 3 for bights 80 and 82 of springs 30 and 32. These bights are secured together by wound string 83. All the adjoining bights of the opposed springs are so joined.

As seen in FIG. 2, buckle 50 has a gripping tongue 84 with serrations on its leading edge to directly grip the free end of strap 38. The buckle has a roller 86 which passes under the free end of strap 40. Buckle 50 as such is known. Straps 38 and 40 clamp between the roller and the tongue. Straps 56 and 58 have an identical buckle and attach to the pan in the same way.

Pan 16 has a hump 88 (FIG. 2) rising rearwardly of the seat base and of a trough 90 (FIG. 1) in the foam material that receives the spring and strap cradle. The hump bottoms the rear seat.

The present invention has been described with reference to a preferred embodiment. The spirit and scope of the appended claims should not, however, necessarily be limited to the foregoing description.

What is claimed is:

1. An improved motorcycle seat comprising:
   (a) a base;
   (b) a seat on the base including a seat bottom and a pair of lateral wings, the wings extending upwardly and laterally from the seat bottom;
   (c) spring means supporting each of the wings and resisting laterally outward and downward forces thereon, the spring means being attached to the base and having a free end above the base in each wing; and
   (d) strap means attached proximate the free ends of the spring means and anchored to the base about midway between the wings, the strap means passing above the spring means and below the seat bottom to provide direct support of the bottom and the wings.

2. The improved motorcycle seat claimed in claim 1 including adjustment means for the straps to lengthen or shorten them, whereby the position of the spring means and the stiffness of the support system of the spring means and strap means can be varied by the adjustment.

3. The improved motorcycle seat claimed in claim 2 wherein the spring means comprise at least one flat spring extending continuously from within one lateral wing to within the other lateral wing.

4. The improved motorcycle seat claimed in claim 3 wherein the continuous spring attaches to the base by the strap means.

5. The improved motorcycle seat claimed in claim 4 wherein the spring is sinuous in form and has serially connected convolutions that lie across the axis of the spring that extends along the length of the spring.

6. The improved motorcycle seat claimed in claim 5 wherein the spring attaches to the base by the strap means passing through a convolution of the spring so that spring material of the convolution engages the strap means.

7. The improved motorcycle seat claimed in claim 3 wherein the strap means attach to the spring means such that a rider's load on the strap means forces the free ends of the spring towards each other and the rider.

8. An improved motorcycle seat of the type having a seat bottom, a wing on each side of the seat bottom extending laterally and upwardly from the seat bottom, a support base below the seat bottom, and cushion means forming a part of the wings and seat bottom for the comfort of a rider on the seat, the improvement comprising:
 (a) spring means supporting each of the wings laterally and vertically on the base and being attached to the base, the spring means having free ends spaced from and above the base; and
 (b) strap means attached to the spring means in each of the wings proximate the free ends thereof and extending above the spring means to about the centerline of the seat, the strap means being anchored to the base providing support for the seat bottom and lateral wings, and supporting the spring means against lateral and downward deflection.

9. The improved motorcycle seat claimed in claim 8 including adjustment means on the strap means to vary the length of the strap means, whereby to vary the resistance of the spring means and strap means to lateral and downward deflection and the contour of the wings with respect to the seat bottom.

10. The improved motorcycle seat claimed in claim 8 wherein the spring means is in the form of at least one sinuous and generally flat spring.

11. The improvement claimed in claim 9 wherein the spring means including at least two opposed, generally flat and sinuous form springs each of a plurality of convolutions, the springs being attached together at adjoining bights of the springs, and the strap means includes strap means for each of the spring means.

12. The improvement claimed in claim 11 wherein each of the springs extends continuously from within one of the wings to within the other of the wings.

13. The improvement claimed in claim 12 wherein the strap means attach to the springs such that a rider's load on the strap means forces the free ends of the springs towards each other and the rider, and the springs bow in the wings to present opposed, concave curves.

14. The improvement claimed in claim 13 wherein the strap means attach each of the springs to the base.

15. The improvement claimed in claim 14 wherein the strap means attach each of the springs to the base by engaging the sides of a convolution of the springs.

16. The improvement claimed in claim 15 wherein the adjustment means includes buckle means beneath the base with means on the buckle means to secure the straps to the base at their desired length.

17. The improvement claimed in claim 16 wherein the base is a pan adapted for attachment to the frame of a motorcycle.

18. The improved motorcycle seat claimed in claim 8 including adjustment means on the strap means to vary the length of the strap means, whereby to vary the resistance of the spring means and strap means to lateral and downward deflection and the contour of the wings with respect to the seat bottom.

19. The improved motorcycle seat claimed in claim 18 wherein the spring means is in the form of at least one sinuous and generally flat spring.

20. The improved motorcycle seat claimed in claim 19 wherein the strap means attach to the springs such that a rider's load on the strap means forces the free ends of the springs toward each other and the rider, and the springs bow in the wings to present opposed, concave curves.

21. The improved motorcycle seat claimed in claim 20 wherein the spring means includes at least two opposed, generally flat and sinuous form springs each of a plurality of convolutions, the springs being attached together at adjoining bights of the springs, and the strap means includes strap means for each of the spring means.

* * * * *

UNITED STATES PATENT AND TRADEMARK OFFICE
CERTIFICATE OF CORRECTION

PATENT NO. : 4,124,248
DATED : November 7, 1978
INVENTOR(S) : William J. Mayer

It is certified that error appears in the above-identified patent and that said Letters Patent are hereby corrected as shown below:

Column 5, line 33, delete "including" and insert therefor -- includes -- .

Signed and Sealed this

Thirteenth Day of March 1979

[SEAL]

Attest:

RUTH C. MASON
Attesting Officer

DONALD W. BANNER
Commissioner of Patents and Trademarks